(12) United States Patent
Dyal

(10) Patent No.: US 8,695,372 B1
(45) Date of Patent: Apr. 15, 2014

(54) BEVERAGE COOLING DEVICE WITH ADJUSTABLE COOLING AIR SLIDING PLATE

(76) Inventor: William C. Dyal, Savannah, GA (US)

( * ) Notice: Subject to any disclaimer, the term of this patent is extended or adjusted under 35 U.S.C. 154(b) by 981 days.

(21) Appl. No.: 12/703,359

(22) Filed: Feb. 10, 2010

(51) Int. Cl.
   *F25D 3/08* (2006.01)
(52) U.S. Cl.
   USPC .......................................... 62/457.4; 62/457.7
(58) Field of Classification Search
   USPC ...................................... 62/464, 457.4, 457.7
   See application file for complete search history.

(56) References Cited

U.S. PATENT DOCUMENTS

| | | |
|---|---|---|
| D322,738 S | 12/1991 | Onweiler |
| 5,305,544 A | 4/1994 | Testa, Jr. |
| 5,605,056 A | 2/1997 | Brown et al. |
| 5,636,524 A | 6/1997 | Woods et al. |
| 6,153,857 A | 11/2000 | Gunnels |
| 6,193,097 B1 | 2/2001 | Perianes |
| 6,357,252 B1 | 3/2002 | Rand |
| 6,571,574 B1 * | 6/2003 | Blackstone ..................... 62/420 |
| 6,763,678 B2 | 7/2004 | Harper |
| 7,350,671 B2 * | 4/2008 | Mika et al. ..................... 222/129 |
| 7,475,564 B2 * | 1/2009 | Kagen ........................... 62/457.2 |
| 2007/0012069 A1 | 1/2007 | Girard |
| 2008/0134714 A1 * | 6/2008 | Villanueva .................. 62/457.1 |

\* cited by examiner

*Primary Examiner* — Cheryl J Tyler
*Assistant Examiner* — Jonathan Koagel

(57) ABSTRACT

A cooler device for storing food items separately from the ice and liquid used to keep the food items cold. The cooler device has a first half housing and a second half housing, in which the bottom surface of the first half housing is removably attached to the top edge of the second half housing; a lid for attaching to the top edge of the first half housing; a plurality of vents disposed in a tray near the bottom surface of the first half housing; a sliding plate with apertures disposed in the tray near the bottom surface of the first half housing, the sliding plate can slide within the tray located near the bottom surface of the first half housing between an open position wherein the plate apertures are aligned with the vents and a closed position wherein the sliding plate covers the vents; and a sliding button disposed on the sliding plate, the sliding button provides a user a way of moving the sliding plate between the open position and the closed position.

13 Claims, 5 Drawing Sheets

BEVERAGE COOLING DEVICE WITH ADJUSTABLE COOLING AIR SLIDING PLATE

FIELD OF THE INVENTION

The present invention is directed to a cooler, more particularly to a cooler for storing ice and liquid separately from other items such as dry food items and bottles or cans.

BACKGROUND OF THE INVENTION

When dry foods, cans, and bottles are placed in ice in coolers, dirt and germs often contaminate the ice (and water), making it unsuitable for drinking. The present invention features a novel cooler device for storing ice and liquid (e.g., water) separately from other items such as dry food and/or bottles and/or cans. The cooler device can help prevent dirt and germs from the food and bottles from contaminating the ice and water, ensuring the ice and water is kept clean.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a cooler device comprising a first half housing having a bottom surface, an open top, an inner cavity, and a top edge; a second half housing having a bottom surface, an open top, an inner cavity, and a top edge, wherein the bottom surface of the first half housing is removably attached to the top edge of the second half housing via a first attachment means; a lid for attaching to the top edge of the first half housing or to the top edge of the second half housing via a second attachment means; a plurality of vents disposed in the bottom surface of the first half housing; a sliding plate disposed in the bottom surface of the first half housing, the sliding plate comprises a plurality of plate apertures, wherein the sliding plate can slide within the bottom surface of the first half housing between an open position wherein the plate apertures are aligned with the vents and a closed position wherein the sliding plate covers the vents, wherein when the sliding plate is in the open position air or liquid from the inner cavity of the second half housing can exchange with air or liquid from the inner cavity of the first half housing and when the sliding plate is in the closed position air or liquid from the inner cavity of the second half housing cannot exchange with air or liquid from the inner cavity of the first half housing; and a sliding button disposed on the sliding plate, the sliding button provides a user a means of moving the sliding plate between the open position and the closed position.

In some embodiments, the cooler device is generally cylindrical. In some embodiments, the first half housing has a first height and the second half housing has a second height, the first height and second height are about equal. In some embodiments, the first half housing has a first height and the second half housing has a second height, the first height is greater than the second height. In some embodiments, the first half housing has a first height and the second half housing has a second height, the first height is less than the second height. In some embodiments, the cooler device further comprises a handle disposed in the first half housing. In some embodiments, the cooler device further comprises a spout disposed in the second half housing for draining liquid out of the second half housing.

In some embodiments, the first attachment means includes a screw mechanism, a snap mechanism, a clamp mechanism, or a combination thereof. In some embodiments, the first attachment means comprises a first threading disposed in the bottom surface of the first half housing that engages a second threading disposed in the top edge of the second half housing. In some embodiments, a gasket is disposed between the first threading and second threading for helping to create a tight seal between the top edge of the second half housing and the bottom surface of the first half housing. In some embodiments, the lid comprises one or more drink holders. In some embodiments, the second attachment means includes a screw mechanism, a snap mechanism, a clamp mechanism, or a combination thereof.

DESCRIPTION OF PREFERRED EMBODIMENTS

Figure 1:
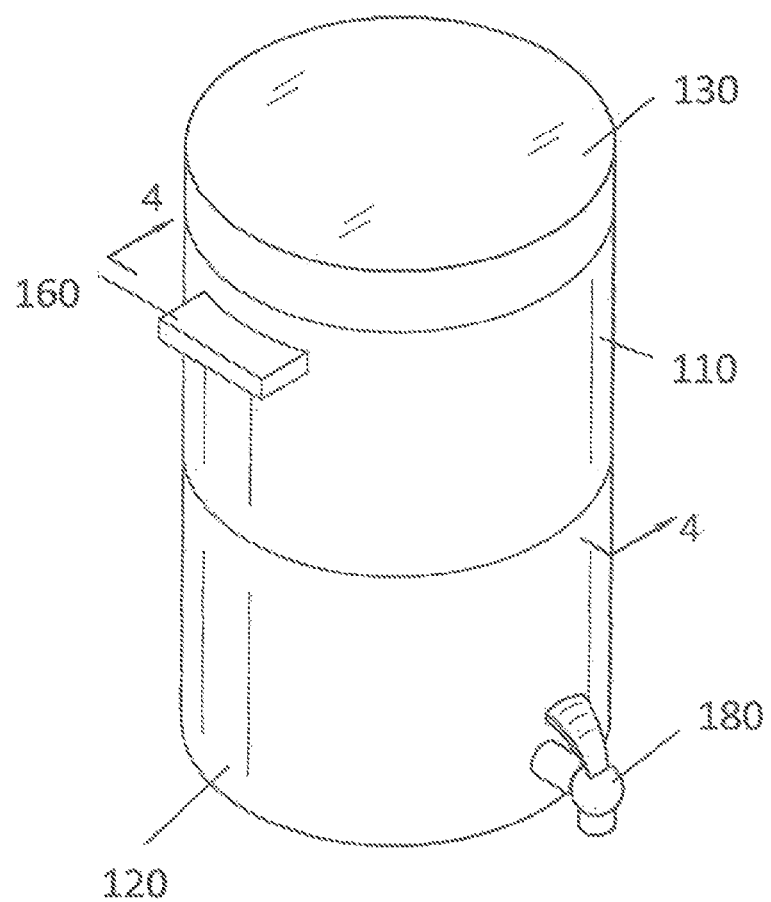
FIG. 1 is a perspective view of the cooler device of the present invention.
Figure 2:
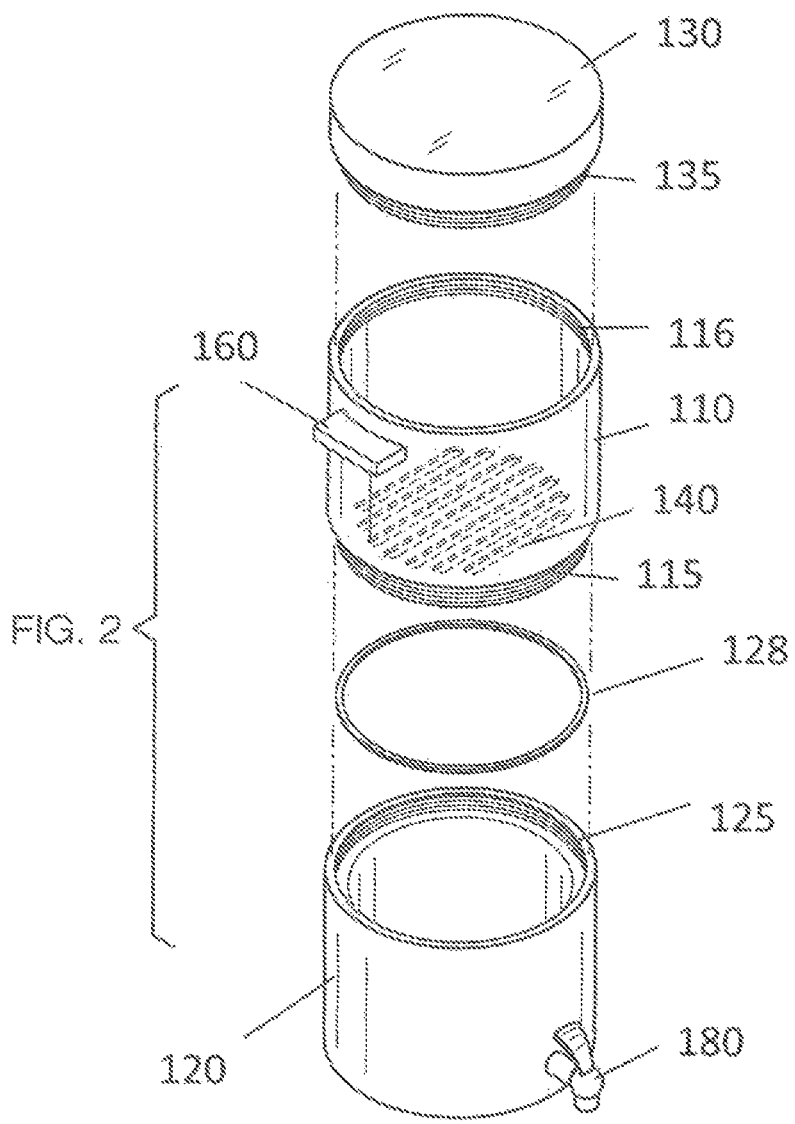
FIG. 2 is an exploded view of the cooler device of FIG. 1.
Figure 3:
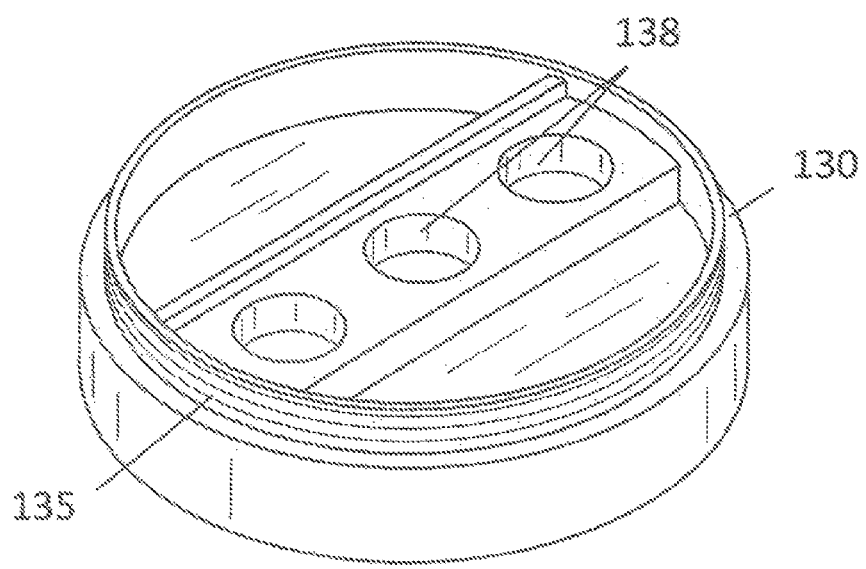
FIG. 3 is a bottom perspective view of the lid of the cooler device of FIG. 1.
Figure 4:
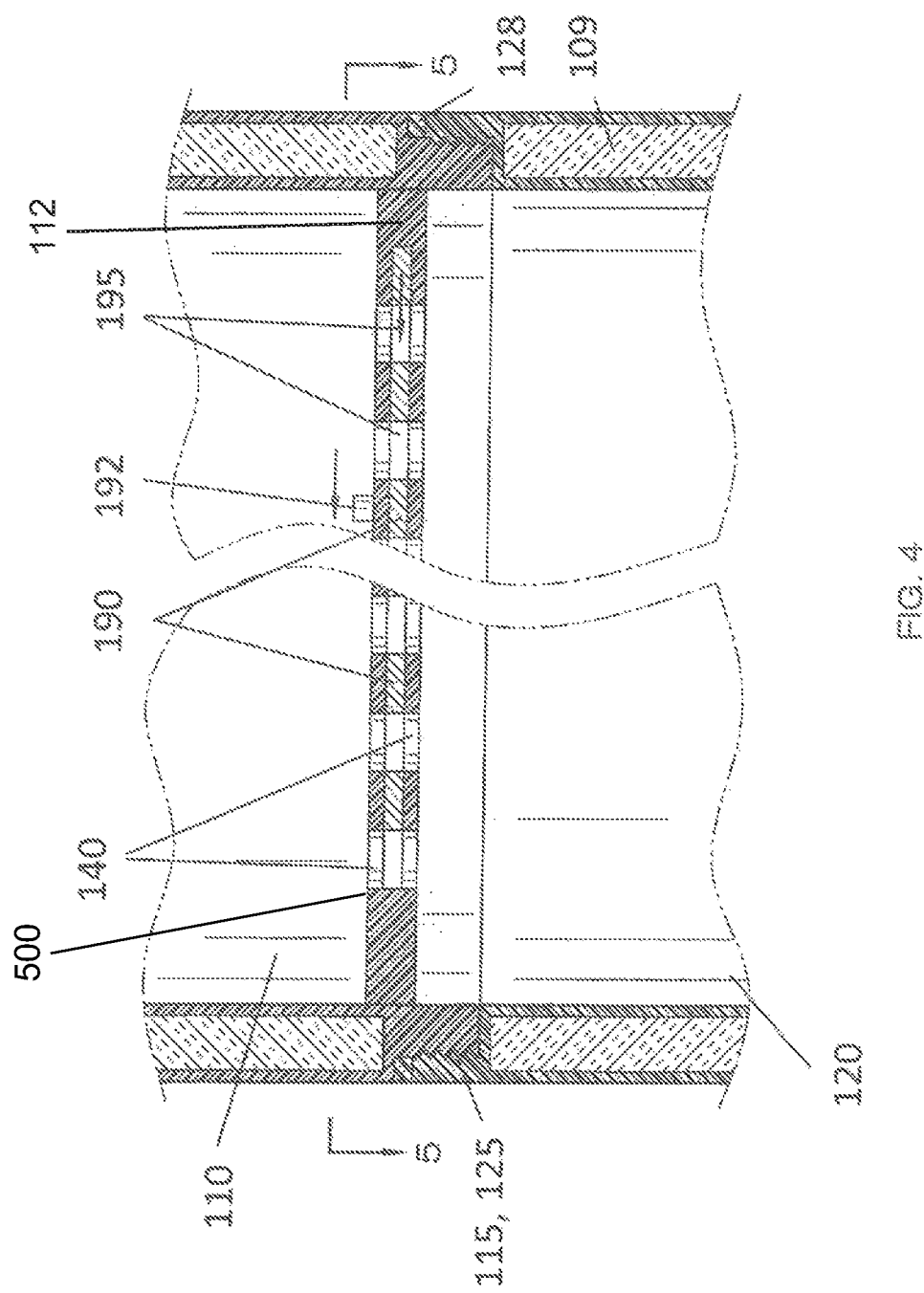
FIG. 4 is a side cross sectional view of the cooler device of FIG. 1.
Figure 5:
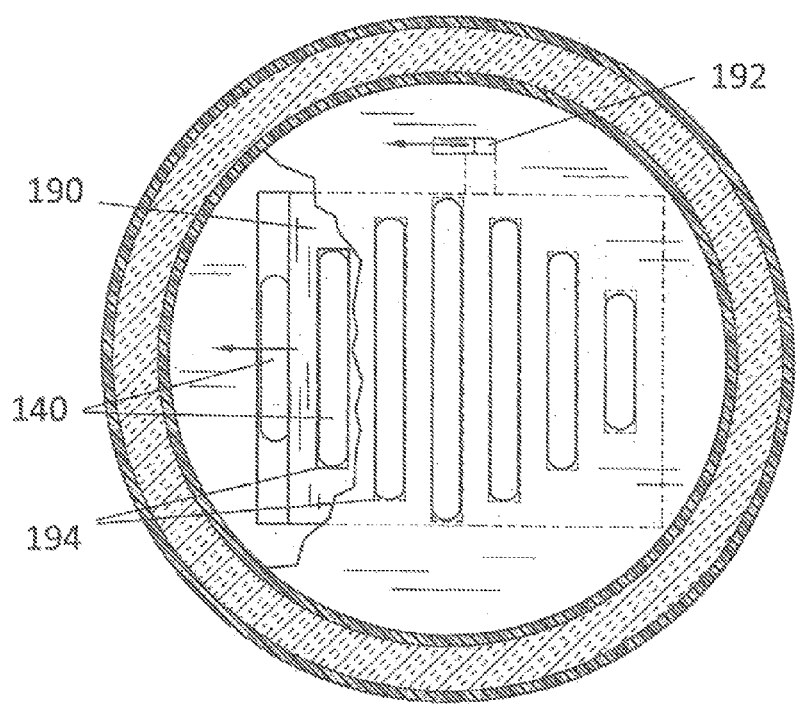
FIG. 5 is a top cross sectional view of the cooler device of FIG. 1.

Referring now to FIGS. 1-5, the present invention features a cooler device 100 for storing ice and liquid (e.g., water) separately from other items such as dry food items and/or bottles and cans. The cooler device 100 can help prevent dirt and germs on the other items from contaminating the liquid and ice, which ensures that the ice and liquid is kept clean and suitable for drinking.

The cooler device 100 comprises a first half housing 110 removably attached to a second half housing 120. The cooler device 100 may be generally cylindrical but is not limited to this shape. The cooler device 100 is constructed from materials used in standard coolers, for example plastics, insulation 109, and the like.

The cooler device 100 may be constructed in a variety of sizes. For example, in some embodiments, the cooler device 100 is between about 18 to 24 inches in height as measured from the top edge of the first half housing 110 to the bottom surface of the second half housing 120. In some embodiments, the cooler device 100 is between about 24 to 30 inches in height as measured from the top edge of the first half housing 110 to the bottom surface of the second half housing 120. In some embodiments, the cooler device 100 is more than about 30 inches in height as measured from the top edge of the first half housing 110 to the bottom surface of the second half housing 120. In some embodiments, the cooler device 100 is between about 8 to 12 inches in diameter. In some embodiments, the cooler device 100 is more than about 12 inches in diameter.

The first half housing 110 and second half housing 120 may be constructed in various sizes. For example, in some embodiments, the first half housing 110 has a volume of between about 2 to 3 gallons. In some embodiments, the first half housing 110 has a volume of between about 3 to 4 gallons. In some embodiments, the first half housing 110 has a volume of more than about 4 gallons. In some embodiments, the second half housing 120 has a volume of between about 2 to 3 gallons. In some embodiments, the second half housing 120 has a volume of between about 3 to 4 gallons. In some embodiments, the second half housing 120 has a volume of more than about 4 gallons.

In some embodiments, the first half housing 110 is the same height as the second half housing 120. In some embodiments, the first half housing 110 is greater in height than the second half housing 120. In some embodiments, the first half housing 110 is less in height than the second half housing 120.

As used herein, the term "about" refers to plus or minus 10% of the referenced number. For example, an embodiment wherein the cooler device 100 is about 10 inches in diameter includes a cooler device 100 that is between 9 and 11 inches in diameter.

The first half housing 110 has a top edge, an open top, a bottom surface 500, an inner cavity and a tray 112 near the bottom surface. The second half housing 120 has a top edge, an open top, a bottom surface, and an inner cavity. The bottom surface of the first half housing 110 is removably attached to the top edge of the second half housing 120 via a first attachment means. In some embodiments, the first attachment means includes a screw mechanism, a snap mechanism, a clamp mechanism, the like, or a combination thereof. For example, in some embodiments, threading (e.g., male threading 115) is disposed in the bottom surface of the first half housing 110 that screws into threading (e.g., female threading 125) disposed in the top edge of the second half housing 120. A gasket 128 may be inserted between the threading to help create a tight seal between the top edge of the second half housing 120 and the bottom surface of the first half housing 110.

The cooler device 100 may further comprise a spout 180 and/or a handle 160 disposed in the first half housing 110 and/or second half housing 120. Spouts and handles are well known to one of ordinary skill in the art.

The cooler device further comprises a lid 130 having a top surface and a bottom surface for attaching to the top edge of the first half housing 110 or the top edge of the second half housing 120 via a second attachment means. In some embodiments, the second attachment means includes a screw mechanism, a snap mechanism, a clamp mechanism, the like, or a combination thereof. For example, in some embodiments, threading (e.g., male threading 135) is disposed in the bottom surface of the lid 130 that screws into threading (e.g., female threading 126) disposed in the top edge of the first half housing 110.

In some embodiments, the lid 130, for example the bottom surface of the lid 130 comprises one or more drink holders 138.

In some embodiments, one or more vents 140 are disposed in the tray 112 near the bottom surface of the first half housing 1110. The vents 140 can be opened and closed. When opened, the vents 140 may allow cool air from the contents of the second half housing 120 to cool the contents in the first half housing 110. In some embodiments, a sliding plate 190 comprising a plurality of plate apertures 194 is disposed in a cavity 195 within a tray near the bottom surface of the first half housing 110. The sliding plate 190 can slide within the tray 112 and move between an open position and a closed position. In the open position, the plate apertures 194 are aligned with the vents 140, and the first half housing 110 is fluidly connected to the second half housing 120. In the closed position, the plate apertures 194 are not aligned with the vents 140. The sliding plate 190 prevents air and/or liquid from traveling between the first half housing 110 and second half housing 120, in some embodiments, a sliding button 192 is disposed on the sliding plate 190 that allows a user to move the plate 190 between the open and closed positions. Such sliding plate mechanisms are well known to one of ordinary skill in the art. The tray 112 gives structural support to the sliding plate 190.

In some embodiments, the second half housing 120 may be filled with ice and/or liquid (e.g., water). The first half housing 110 may then be attached to the top edge of the second half housing 120. A user can choose whether to move the sliding plate to the open position or the closed position. He/she can fill the first half housing 110 with items such as food, bottles, and/or cans. The lid 130 can be attached to the top edge of the first half housing 110.

The following the disclosures of the following U.S. Patents are incorporated in their entirety by reference herein: U.S. Pat. No. 5,605,056; U.S. Pat. No. 5,305,544; U.S. Pat. No. 6,357,252; U.S. Pat. No. 6,153,857; U.S. Pat. No. 6,193,097; U.S. Pat. No. 6,763,678; U.S. Pat. No. 5,636,524; U.S. Pat. Application No. 2007/0012069.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A cooler device comprising:
   (a) a first half housing having a bottom surface, an open top, an inner cavity, a top edge and a tray near the bottom surface;
   (b) a second half housing having a bottom surface, an open top, an inner cavity, and a top edge, wherein the bottom surface of the first half housing is removably attached to the top edge of the second half housing via a first attachment means;
   (c) a lid for attaching to the top edge of the first half housing or to the top edge of the second half housing via a second attachment means;
   (d) a plurality of vents disposed in the tray of the first half housing;
   (e) a sliding plate embedded in the tray near the bottom surface of the first half housing, the sliding plate comprises a plurality of plate apertures, wherein the sliding plate can slide within the tray of the first half housing between an open position wherein the plate apertures are aligned with the vents and a closed position wherein the sliding plate covers the vents, wherein when the sliding plate is in the open position air or liquid from the inner cavity of the second half housing can exchange with air or liquid from the inner cavity of the first half housing and when the sliding plate is in the closed position air or liquid from the inner cavity of the second half housing cannot exchange with air or liquid from the inner cavity of the first half housing; and
   (h) a sliding button disposed on the sliding plate, the sliding button provides a user a means of moving the sliding plate between the open position and the closed position.

2. The cooler device of claim 1, wherein the cooler device is generally cylindrical.

3. The cooler device of claim 1, wherein the first half housing has a first height and the second half housing has a second height, the first height and second height are about equal.

4. The cooler device of claim 1, wherein the first half housing has a first height and the second half housing has a second height, the first height is greater than the second height.

5. The cooler device of claim 1, wherein the first half housing has a first height and the second half housing has a second height, the first height is less than the second height.

6. The cooler device of claim 1 further comprising a handle disposed in the first half housing.

7. The cooler device of claim 1 further comprising a spout disposed in the second half housing for draining liquid out of the second half housing.

8. The cooler device of claim 1, wherein the first attachment means includes a screw mechanism, a snap mechanism, a clamp mechanism, or a combination thereof.

9. The cooler device of claim 1, wherein the first attachment means comprises a first threading disposed in the bottom surface of the first half housing that engages a second threading disposed in the top edge of the second half housing.

10. The cooler device of claim 9, wherein a gasket is disposed between the first threading and second threading for helping to create a tight seal between the top edge of the second half housing and the bottom surface of the first half housing.

11. The cooler device of claim 1, wherein the lid comprises one or more drink holders.

12. The cooler device of claim 1, wherein the second attachment means includes a screw mechanism, a snap mechanism, a clamp mechanism, or a combination thereof.

13. A cooler device consisting of:
(a) a first half housing having a bottom surface, an open top, an inner cavity, a top edge and a tray near the bottom surface;
(b) a second half housing having a bottom surface, an open top, an inner cavity, and a top edge, wherein the bottom surface of the first half housing is removably attached to the top edge of the second half housing via a first attachment means;
(c) a lid for attaching to the top edge of the first half housing or to the top edge of the second half housing via a second attachment means;
(d) a plurality of vents disposed in the tray of the first half housing;
(e) a sliding plate embedded in the tray near the bottom surface of the first half housing, the sliding plate consists of a plurality of plate apertures, wherein the sliding plate can slide within the tray of the first half housing between an open position wherein the plate apertures are aligned with the vents and a closed position wherein the sliding plate covers the vents, wherein when the sliding plate is in the open position air or liquid from the inner cavity of the second half housing can exchange with air or liquid from the inner cavity of the first half housing and when the sliding plate is in the closed position air or liquid from the inner cavity of the second half housing cannot exchange with air or liquid from the inner cavity of the first half housing; and
(h) a sliding button disposed on the sliding plate, the sliding button provides a user a means of moving the sliding plate between the open position and the closed position.

* * * * *